(No Model.) 2 Sheets—Sheet 1.

E. WESTON.
GROUND DETECTOR FOR ELECTRIC CIRCUITS.

No. 494,830. Patented Apr. 4, 1893.

WITNESSES:
Gustave Dieterich
H. R. Hollen

INVENTOR
Edward Weston
BY
Park Benjamin
his ATTORNEY.

(No Model.) 2 Sheets—Sheet 2.
E. WESTON.
GROUND DETECTOR FOR ELECTRIC CIRCUITS.
No. 494,830. Patented Apr. 4, 1893.
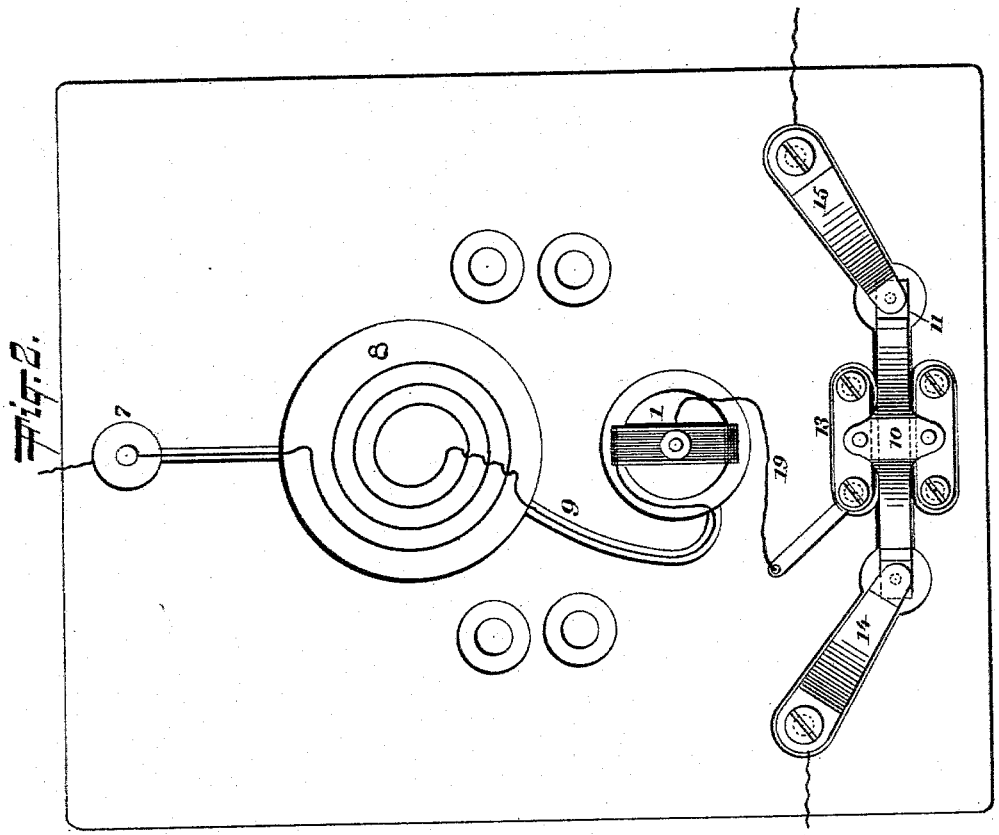
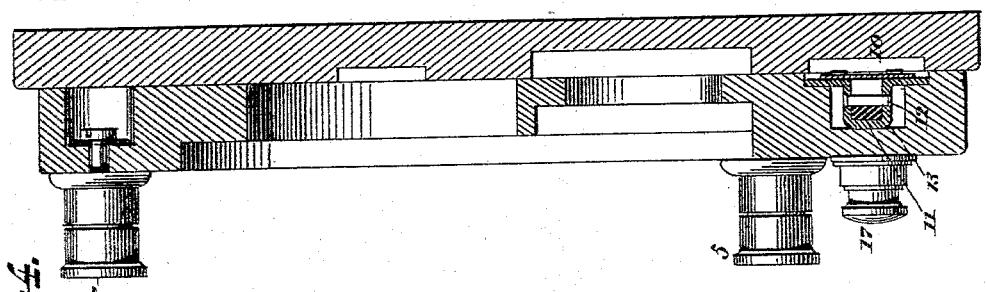
WITNESSES:
Gustave Dieterich
H. R. Moller
INVENTOR
Edward Weston
BY
Park Benjamin
His ATTORNEY.

UNITED STATES PATENT OFFICE.

EDWARD WESTON, OF NEWARK, NEW JERSEY.

GROUND-DETECTOR FOR ELECTRIC CIRCUITS.

SPECIFICATION forming part of Letters Patent No. 494,830, dated April 4, 1893.

Application filed September 10, 1892. Serial No. 445,564. (No model.)

*To all whom it may concern:*

Be it known that I, EDWARD WESTON, of Newark, Essex county, New Jersey, have invented a new and useful Improvement in Ground-Detectors for Electric Circuits, of which the following is a specification.

The object of my invention is to provide an instrument which can be used to detect ground in electric circuits, and also to measure the insulation resistance of the circuit and show the condition thereof from hour to hour or day to day. By this means any serious change in the insulation resistance of the circuit can be at once detected.

My invention consists in a novel construction and arrangement of parts whereby an electrical measuring instrument already heretofore patented by me in Letters Patent No. 392,386, dated November 6, 1888, and in various other Letters Patent of subsequent date, is adapted to the purposes above mentioned.

In the accompanying drawings is represented an instrument substantially the same as is fully shown and described in my Letters Patent aforesaid; and therefore, only so much of said instrument as is necessary for an understanding of my present invention is here shown. For other details particular reference is made to said Letters Patent.

Figure 1:
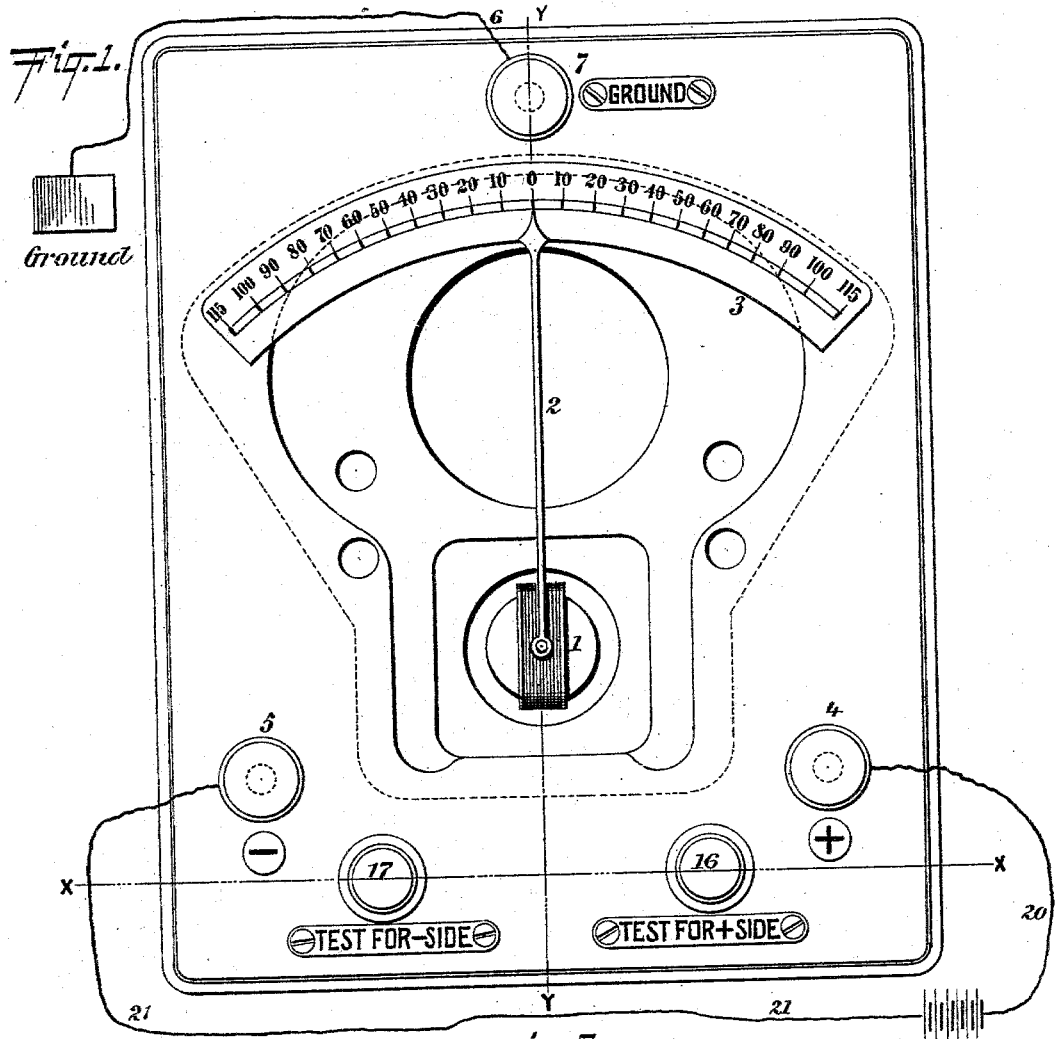
Figure 3:
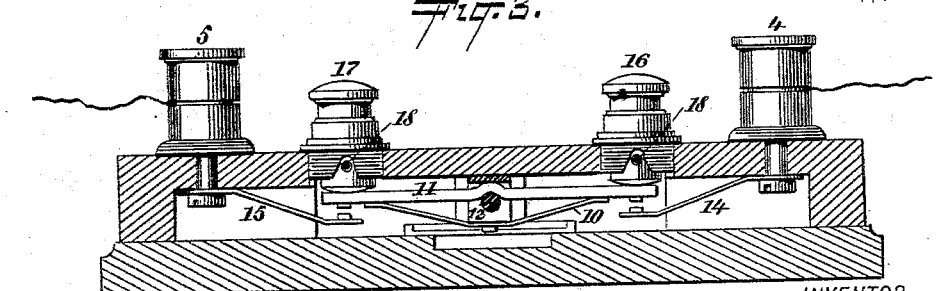

In said drawings Figure 1 is a plan view, Fig. 2 a bottom view, Fig. 3 a section on line $x\ x$ and Fig. 4, a section on line $y\ y$.

Similar letters and figures of reference indicate like parts.

1 is the pivoted movable coil, supported between the poles of a permanent magnet and provided, as described in my Letters Patent aforesaid, with spiral springs which oppose and counterbalance the impressed movement of said coil due to the passage of the current through it, and also serve as leaders for the current into and out of said coil. The coil arbor carries an index needle, 2, which moves over a scale, 3. Said scale is graduated from zero at its middle point up to one hundred and fifteen divisions at each end. The coil is so disposed that when no current traverses the instrument, the needle 2 stands at zero. The + and − line wires are connected respectively to the binding posts 4 and 5. The ground wire 6 is connected to the binding post 7, and said binding post 7 communicates with one terminal of a resistance coil 8 (indicated symbolically in Fig. 2), the other terminal of which connects by wire 9 with one end of the movable coil 1. The other end of coil 1 connects by wire 19 with the oscillating metal lever 11. The two-armed leaf spring, 10, is fastened to the base of the instrument, and its arms bear against the under side of said oscillating metal lever. Said lever is supported on a cross bar 12, which is held in a bracket, 13.

Connected to the binding posts 4 and 5, are leaf springs 14 and 15 which extend under the arms of the lever 11. Said lever arms and said springs are provided with contact points or pins, as shown. Above each arm of the lever 11 is arranged a press button or pin, 16 and 17, the lower ends of which buttons bear upon said lever. By pressing down the button 16, one arm of lever 11 is brought into contact with the spring 14; and by pressing down the button 17, the other arm of lever 11 is brought into contact with spring 15. When neither press button, 16 or 17, is down, the spring 10, acting upon the lever 11, keeps it out of contact with either spring 14 or 15, and thus circuit is normally interrupted through the instrument.

The resistance coil 8 is made of known resistance ($r$). When the button 16 is pressed down, circuit will be made from the source of electricity by wire 20 Fig. 1 through the + side of the line, the movable coil 1, the resistance coil 8 and to ground, and the needle 2, deflecting to the left, will show the potential difference of the circuit thus established. When the button 17 is pressed down, circuit will be made by wire 21 through the − side of the line, the movable coil 1, the resistance coil 8 and to ground, and the needle 2, deflecting to the right, will show the potential difference, R, of the circuit thus established. If there be a dead ground on either side of the line, the needle will go to its limit (one hundred and fifteen volts); otherwise, the deflection will indicate a less potential difference. The normal potential difference on the line and the resistance in the instrument being already known, it remains to determine by a simple calculation the insulation resistance of the plant on either side of the line.

The press buttons 16 and 17 are provided with projecting pins, 18, which, when said buttons are pressed downward, leave recesses or notches in the sockets in which they are retained, and when said press buttons are rotated on their axes, engage with the lower side of the plate through which said buttons pass, and thus prevent said buttons from rising under the action of the spring 10. In this way, either button 16 or 17 may be held in depressed position as long as desired.

By arranging suitable connections from the binding posts 4 and 5 to the movable coil and resistance coil, substantially as shown in my Letters Patent aforesaid, the same instrument may be employed to determine V or the potential difference on the line. Any suitable switch may be arranged to throw these connections out of use when the instrument is to be employed in the manner above described.

Having once determined the insulation resistance of both sides of the circuit in the manner above described, it is not necessary every time a test is made to repeat the calculation above mentioned, because, if the needle of the instrument comes to nearly the same point each time thereafter when a test is made, it is proof that the insulation resistance has not materially changed. If, however, the instrument shows a much larger deflection in a subsequent test, the calculation should be repeated and a comparison of results made with those of the former trial. If the difference be great, the circuits should at once be examined, and the cause of the reduced insulation resistance discovered and removed. A greater deflection of the needle with the same voltage on the circuit always indicates a reduction of insulation resistance, and a less deflection of the needle with the same voltage means an increase in the insulation of the circuit.

In another application Serial No. 445,563 for Letters Patent filed simultaneously herewith, I have fully described and claimed a method of determining resistance, leakage and grounds on electric circuits, which method is substantially that carried into effect by my present apparatus. I therefore do not claim in my present application the said method.

I claim—

1. In combination with an electrical measuring instrument of the type hereinbefore described having a coil vibrating or oscillating in a field of force and means for indicating the extent of movement of said coil, a resistance in series circuit with one terminal of said coil and with ground, and in circuit with the other terminal of said coil a source of electricity and a means of closing circuit from either the positive or negative pole of said source through said coil and to resistance and ground.

2. In an electrical measuring instrument, a coil vibrating or oscillating in a field of force, an index actuated thereby, a fixed resistance in circuit with one terminal of said coil, and in combination with the other terminal of said coil means for moving said other terminal into electrical connection with one or the other of two separated conductors.

3. In an electrical measuring instrument, a coil vibrating or oscillating in a field of force, an index actuated thereby, a fixed resistance in circuit with one terminal of said movable coil and a vibrating lever connected to the other terminal of said coil, and means for moving said lever into contact with one or the other of two separated conductors and thereby establishing circuit from said coil to either of said conductors.

4. In an electrical measuring instrument in combination with a coil vibrating or oscillating in a field of force, an index actuated thereby, a fixed resistance in circuit with one terminal of said movable coil, a pivoted lever, 11, electrically connected to the other terminal of said coil, a spring, 10, acting upon said lever on opposite sides of its fulcrum, press buttons, 16, 17, acting upon said lever against said spring, and contact springs, 14 and 15, arranged in proximity to said lever and connected to binding posts; the aforesaid parts being constructed and operating so that when said lever is oscillated by pressure upon one of said press buttons, the end thereof depressed may be brought into electrical contact with the adjacent spring, 14 or 15, substantially as described.

EDWARD WESTON.

Witnesses:
A. H. HOEFER,
JOHN C. YOUNG.